(12) United States Patent
Cipolla et al.

(10) Patent No.: US 6,507,488 B1
(45) Date of Patent: Jan. 14, 2003

(54) FORMED HINGES WITH HEAT PIPES

(75) Inventors: Thomas Mario Cipolla, Katonah, NY (US); Lawrence Shungwei Mok, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,379

(22) Filed: Apr. 30, 1999

(51) Int. Cl.$^7$ .................................................. G06F 1/20

(52) U.S. Cl. ..................... 361/687; 361/699; 361/700; 165/104.32; 364/708.1

(58) Field of Search .................. 361/683, 687, 361/698, 699, 700, 704, 707; 165/80.3, 80.4, 104.32, 104.33, 104.34, 185; 364/708.1; 174/15.2; 16/223, 342; 257/714, 715

(56) References Cited

U.S. PATENT DOCUMENTS

| | | | |
|---|---|---|---|
| 3,831,664 A | * 8/1974 | Pogson | 165/105 |
| 5,313,362 A | 5/1994 | Hatada et al. | |
| D376,971 S | * 12/1996 | Schutz | D8/323 |
| 5,588,483 A | 12/1996 | Ishida | |
| 5,646,822 A | 7/1997 | Bhatia et al. | |
| 5,796,581 A | 8/1998 | Mok | |
| 5,832,987 A | * 11/1998 | Lowry et al. | 165/86 |
| 6,075,696 A | * 6/2000 | Progl | 361/687 |
| 6,097,596 A | * 8/2000 | Cipolla et al. | 361/687 |
| 6,288,896 B1 | * 9/2001 | Hsu | 361/687 |

FOREIGN PATENT DOCUMENTS

| | | | | |
|---|---|---|---|---|
| JP | 411330757 A | * | 11/1999 | H05K/7/20 |
| JP | 02000065489 A | * | 3/2000 | F28D/15/02 |
| JP | 02000277963 A | * | 10/2000 | H05K/7/20 |

OTHER PUBLICATIONS

Masataka Mochiuki, et al., "Hinged Heat Pipes For Cooling Notebook PCs", *Thirteenth IEEE Semi-Therm™ Symposium*, 1997, pp. 64–72.

Albert Yu, "The Future of Microprocessors", *IEEE Micro*, Dec. 1996, pp. 46–53.

* cited by examiner

Primary Examiner—Darren Schuberg
Assistant Examiner—Michael Datskovsky
(74) Attorney, Agent, or Firm—Scully, Scott, Murphy & Presser; Daniel P. Morris, Esq.

(57) ABSTRACT

A computer which possesses a bottom keyboard housing having a rear edge hingedly connected with the lower edge of an openable display assembly, and wherein heat-generating computer electronics contained in the housing has heat removed therefrom through the intermediary of heat pipes which are hingedly connected with at least one heat dissipator located in the display assembly. In essence, the computer incorporates an inexpensive construction of heat pipe hinges employed in the thermal interconnection of the bottom keyboard housing of the portable personal computer containing the keyboard and electronics with the display assembly, wherein the heat pipes are protected from bending stresses prior to assembling the major portions of the portable personal computer, such as the keyboard housing and the display assembly.

26 Claims, 4 Drawing Sheets

FORMED HINGES WITH HEAT PIPES

BACKGROUND OF THE INVENTION

The present invention relates to an arrangement for enhancing the cooling capacity of portable personal computers. More particularly, the invention is directed to the provision of an arrangement for increasing the cooling capacity of portable personal computers, particularly such as laptop and notebook computers wherein the computer possesses a keyboard housing having a rear edge hingedly connected with the bottom of an openable display unit or assembly, and wherein heat-generating computer electronics contained in the housing has heat removed therefrom through the intermediary of heat pipes which are hingedly connected with at least one heat dissipator located in the display assembly. In essence, the inventive concept is directed to an inexpensive construction of heat pipe hinges employed in the interconnection of the keyboard housing of the portable personal computer containing the keyboard and electronics with the display assembly, wherein the heat pipes are protected from bending stresses prior to assembling the major portions of the portable personal computer, such as the keyboard housing and the display assembly.

Commencing from the time of conception and design development of computers, and especially portable personal computers; for instance, such as laptop computers or the like, there has been encountered the aspect of thermal management as a result of heat which is generated by the processor and other electronic components of the computer. As is widely known in the computer technology, excessive amounts of heat can readily degrade the performance of computers, and additionally may cause the components of the computers to be damaged. Consequently, thermal management is frequently considered to be an extremely important aspect in the design and development of computers.

The capacity and performance of portable personal computers, such as laptop computers, notebook computers or the like, has recently been enhanced to such an extent that; for example, since the beginning of 1996, the thermal dissipation requirements of portable personal computers (PCS) have increased from about 10 watts to 25 watts and even higher values. This increase in the thermal dissipation requirements is a result of ever increasing CPU performance and additional functionality; such as DVD, modem, audio and the like, which are provided by future PCS. As elucidated in an article by Albert Yu, "The Future of Microprocessors", IEEE Micro, December 1996, pages 46 through 53, the trend of increasing power dissipation in the form of heat for portable personal computers will continue in the foreseeable future. Thus, at the widely employed A4 form factor for a portable personal computer; in essence, a 297 by 210 mm footprint, for instance, the cooling limit for a portable PC without an active cooling device, such as a cooling fan or providing additional passive cooling capacity is currently approximately 15 to 20 watts. Although cooling capacity can be added through the installation of an active cooling device, such as a fan, this is normally not desirable inasmuch as these devices take up space, consume power and generate noise. Particularly in a portable personal computer, space and battery consumption and life is at a premium, and the generating of noise is deemed to be highly undesirable. As a result, active cooling devices have been employed as a last resort in attempts to obtain additional cooling capacity. In contrast therewith, passive cooling methods and arrangements are considered to be most desirable and efficient since they do not consume any power, generate no noise and quite often take up no additional space. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

In particular with regard to the power consumption of laptop computers, there has been recently a continued increase in the power of the CPU. For example, the total power of a laptop computer is normally about 10 watts, and has now increased to a range of about 30 to 40 watts or higher, whereas the CPU power has been increased from about 2 to 6 watts and, conceivably, can be as high as in the 15 watt range. Most of this power will eventually be dissipated in the form of heat to the surroundings. Consequently, being able to remove increased amounts of heat from the laptop computer becomes a critical factor in the construction and operation of such laptop computers.

DISCUSSION OF THE PRIOR ART

Various arrangements and devices for increasing the cooling capacities of portable personal computers, particularly such as laptop or notebook computers, are presently known and widely employed in the technology.

Mok, U.S. Pat. No. 5,796,581 discloses an arrangement and method for enhancing the cooling capacity of portable personal computers wherein a double-shelled rotational heat conduction apparatus has heat pipes interconnecting a liquid-crystal display with the heat-generating electronics of a laptop computer which are located in the keyboard housing, and enabling rotation of the heat pipes through a hinged construction.

Bhatia, et al., U.S. Pat. No. 5,646,822 discloses a heat pipe exchange system which consists of two heat pipes which are brought together within a hollow sleeve filled with a thermally conductive grease. The heat exchange system does not address itself to any means of lowering the thermal resistance between the two heat pipes, which is considered to be critical in actual physical applications.

Ishida, U.S. Pat. No. 5,588,483 discloses a heat radiating apparatus for a computer possessing a heat pipe which is connected to a heat radiating plate and a heat receiving plate, and a medium for heat transfer purposes.

The heat pipe includes an internal space filled with a grease having a high thermal conductivity.

Hatada, et al., U.S. Pat. No. 5,313,362 discloses a laptop or notebook computer which incorporates radiator structure including fins for dissipating and eliminating heat generated therein through convection, and further includes the utilization of heat pipes of various configurations.

Masatake Mochizuki, et al., et al. "Hinged Heat Pipes for Cooling Notebook PCS", Thirteenth IEEE SEMI-THERM Symposium, pages 64–72, 1997, discusses the utilization of hinged heat pipes for cooling notebook PCS. The apparatus disclosed in this publication provides for the interconnection of two heat pipes utilizing clamps, wherein there is also employed a dry contact and clamping force in order to maintain a thermal contact which is subject to mechanical wear and environmental contamination.

Although the foregoing publications to varying degrees each concern themselves with the transfer of heat from the electronics of a portable personal computer arranged in a body or housing having a keyboard therein, and wherein the heat pipes extend so as to form hinged connections oriented towards a heat sink contained in a display assembly having a display panel therein, and which is hinged to the housing, none of the publications are directed to the aspect of inexpensively manufacturing heat pipe hinges. In such constructions, a first heat pipe transfers the heat output from the first heat pipe to a second heat pipe structure which is rotationally connected to the first heat pipe to form a hinge joint, and then transferring the heat output of the second pipe to a heat spreader in the display assembly which, in turn, dissipates the heat to the surroundings. The inexpensive manufacture of such heat pipe hinges and improvements effected thereto are adapted to facilitate the assembly and repair of the computer by protecting the heat pipe components from bending stresses which are encountered prior to the major elements of the computer being assembled, or during disassembly for repair, and enabling the display assembly to be completely assembled prior to hinged attachment to the body or housing of the computer containing the keyboard and the heat-generating electronics.

In essence, an aspect which has generally not been fully addressed in the manufacture of portable personal computers resides in the fact that the display assembly which normally contains the liquid-crystal display and which constitutes the cover structure of the portable personal computer hingedly connected to the keyboard housing is generally assembled by a display vendor or in the facility of the primary manufacturer, at a location which is different from that in which the main assembly, constituting the body or housing of the portable personal computer including the keyboard electronics, is implemented. Generally the complete display assembly consists of a flat panel display, mechanical hinges, one or more circuit boards, one or more cables, a back cover and a front bezel. Normally, the entire display assembly is attached to the main body of the computer by means of protruding mechanical hinges and then the protruding cables are plugged in to form an operative circuit. Any further elements which are added to this particular assembly procedure do not lend themselves itself to this manufacturing scenario, and thereby render the assembly more costly which, in turn, increases the cost of the computer. Thus, in the event that an attachment must be made below the bezel, the latter either must be removed from the display assembly and then reattached, or the display assembly must be forwarded to a final assembly area with the bezel unattached and in a separate condition. A further instance of added manufacturing costs for implementing a final assembly procedure resides in that, if a delicate part of the display assembly is in a protruding condition, the part must be protected or risk of being broken or deformed. This, in particular, is the instance with heat pipe hinges as presently known from the prior art and employed in the technology, wherein the heat pipe hinges are either attached at an end which is located within the display assembly, or at other opposite end, which forces the heat pipe hinge to protrude from the display assembly, with the easily bendable ordinarily copper tubing of the heat pipe being exposed and resultingly unprotected. This renders the heat pipes highly susceptible to being damaged, and thereby carries the risk of destroying the integrity of the heat-removing aspects of the heat pipe arrangement.

Another problem which is encountered in the formation of such heat pipe hinges resides in that, such heat pipe hinges are frequently machined from bar stock, which renders the foregoing procedure relatively expensive in the manufacture of personal portable computers which incorporate heat pipe hinges.

SUMMARY OF THE INVENTION

Accordingly, in order to facilitate the manufacture of inexpensive heat pipe hinges for portable personal computers which meet the thermal management requirements, the invention is directed to the provision of an inexpensive mode of transferring heat through rotatably joined heat pipes from the heat generating device, such as the electronics or a processor (CPU) which is located beneath the keyboard in the base or housing of a portable personal computer to the area between a display assembly hinged to the base by means of hinged heat pipes, and wherein a large generally vertical surface is available on the display assembly for the dissipation of heat into the surroundings.

Accordingly, a primary object of the present invention resides in the provision of an arrangement and of a method for the producing of heat pipe hinges utilizing inexpensive manufacturing methods, such as through the folding or bending of sheet material or by employing inexpensive extrusions.

In that instance, the manufacturing problems encountered in the assembly of personal portable computers utilizing heat pipe hinges is addressed through manufacturing modes which absorb bending stresses which are generated in the heat pipes prior to the assembly of the computer, thereby permitting the display assembly, to be fully assembled prior to the attaching of the display assembly to the computer body or housing containing the electronics and keyboard.

In order to achieve the foregoing, pursuant to an object of the invention, the heat pipe hinges may be formed of bendable sheet metal; preferably of aluminum or copper, or through extrusions of such materials, or from highly heat-conductive materials; for example, such as a graphite fiber composite, although other materials having similar heat-conductive properties may be readily employed in connection with the present invention.

BRIEF DESCRIPTION OF THE DRAWINGS

Reference may now be had to preferred embodiments of heat pipe hinges pursuant to the present invention, taken in conjunction with the accompanying drawings; in which.

DETAILED DESCRIPTION OF PREFERRED EMBODIMENTS

Referring now more specifically to the invention, it is noted that; in essence, from a generally technological standpoint, the heat pipes operate on the basic principle that a liquid will boil when heated while confined in a sealed volume or container. The vapor will flow towards the colder end of the sealed volume or container and there condenses so as thereby transport heat energy from the hot end of the container or volume to the cold end thereof. The resultingly formed condensate then flows back to the hot end of the container by gravity and/or the intermediary of capillary action using a wick arranged in the container. Such devices in themselves are well known in the technology, and are normally capable of transferring heat at a rate at which is equivalent to about 50 to 200 times that of the thermal conductivity of copper.

Figure 1:
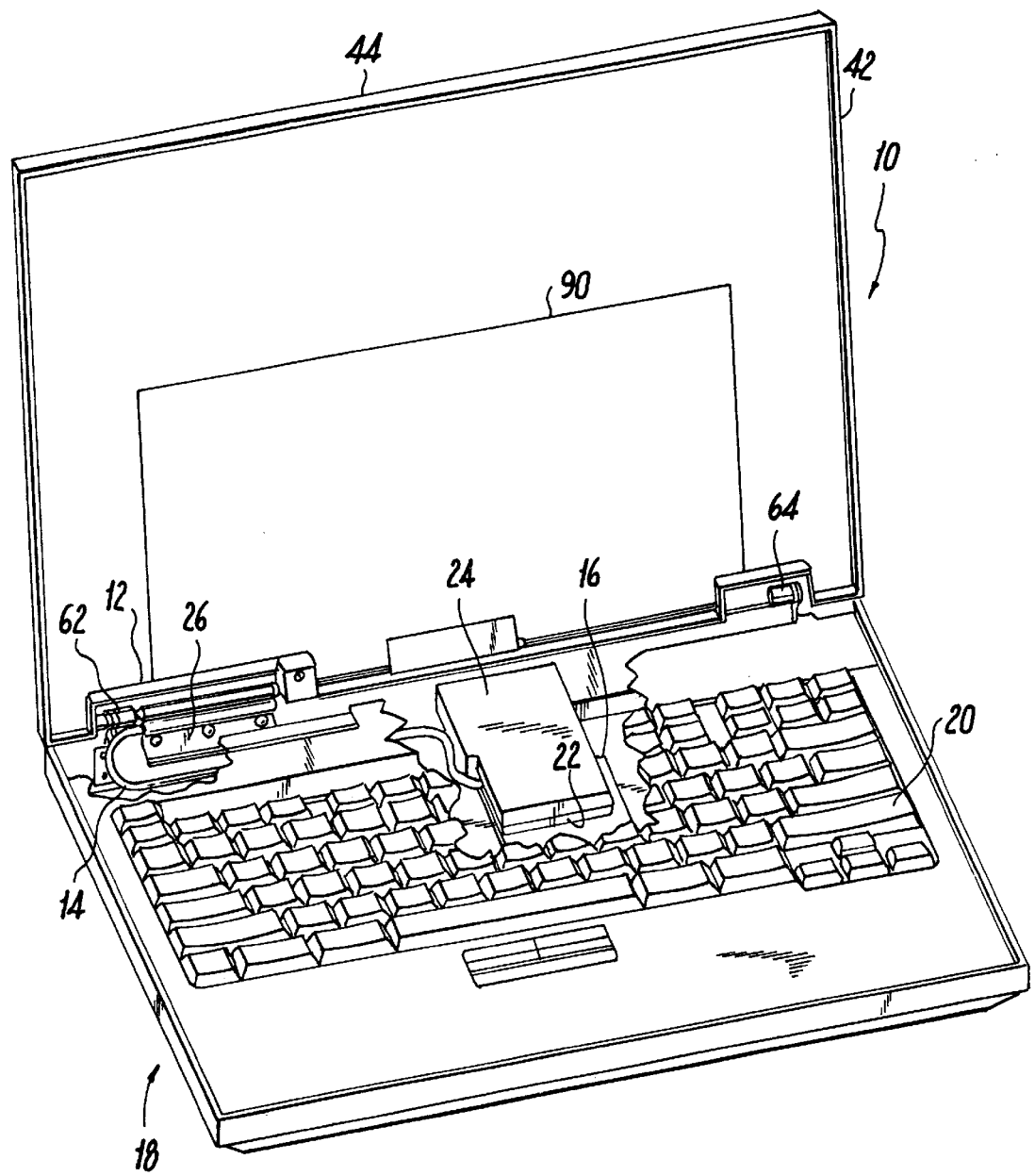
FIG. 1 illustrates a perspective view of a portable personal computer pursuant to the invention, in which various component details, such as the display, display bezel and various other components have been removed for purposes of clarity.

Having particular reference to FIG. 1 of the drawings, which illustrates a perspective representation of a portable personal computer 10, the latter employs a heat pipe hinge 12, and a primary heat pipe 14 which is thermally connected to a heat-generating element, such as a processor or a CPU (not shown) which located on a circuit board 16. The physical structure of the heat-generating element is normally arranged in the lower housing or base portion 18 of the personal portable computer 10, which also supports the keyboard 20 and other required components for operating the computer 10, as is well known in the technology. A heat spreader 22 which is connected to the heat-generating element or processor constitutes a connecting device for the heat pipe 14 to the processor. Moreover, a supplemental cooling arrangement may be optionally provided in the form of a fan 24, although this does not comprise a part of the present invention.

Figure 2:
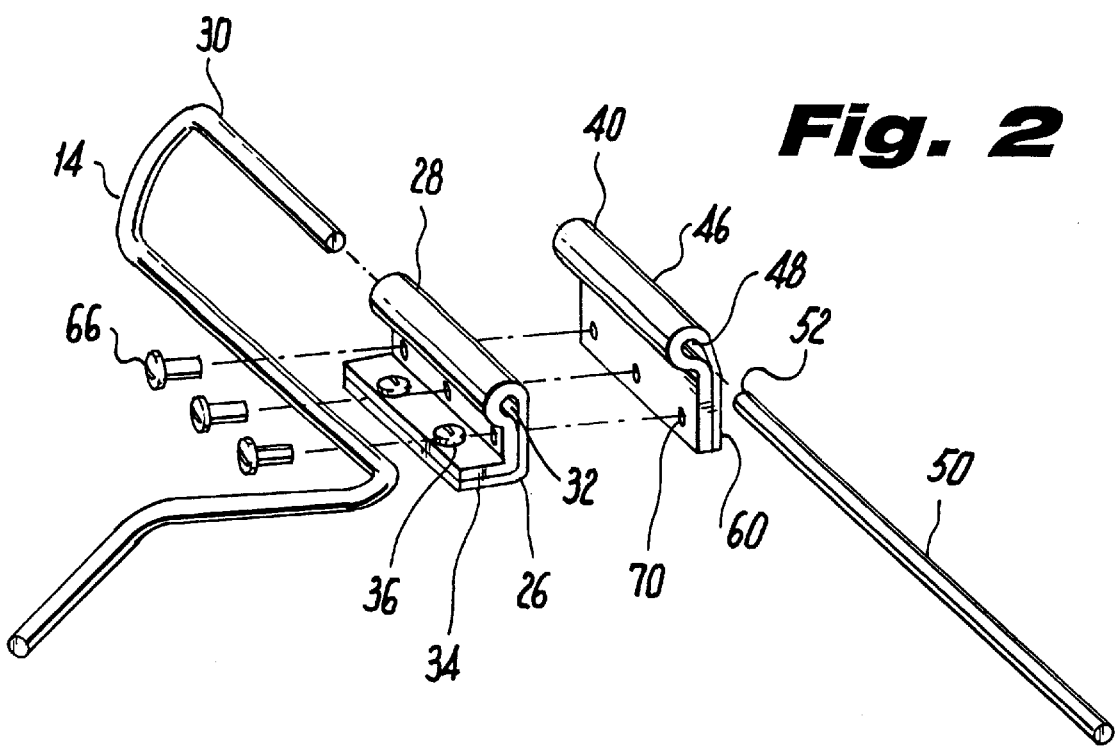
FIG. 2 illustrates an enlarged perspective representation of a first embodiment of a heat pipe hinge construction formed from flat bendable sheet metal.
Figure 3:
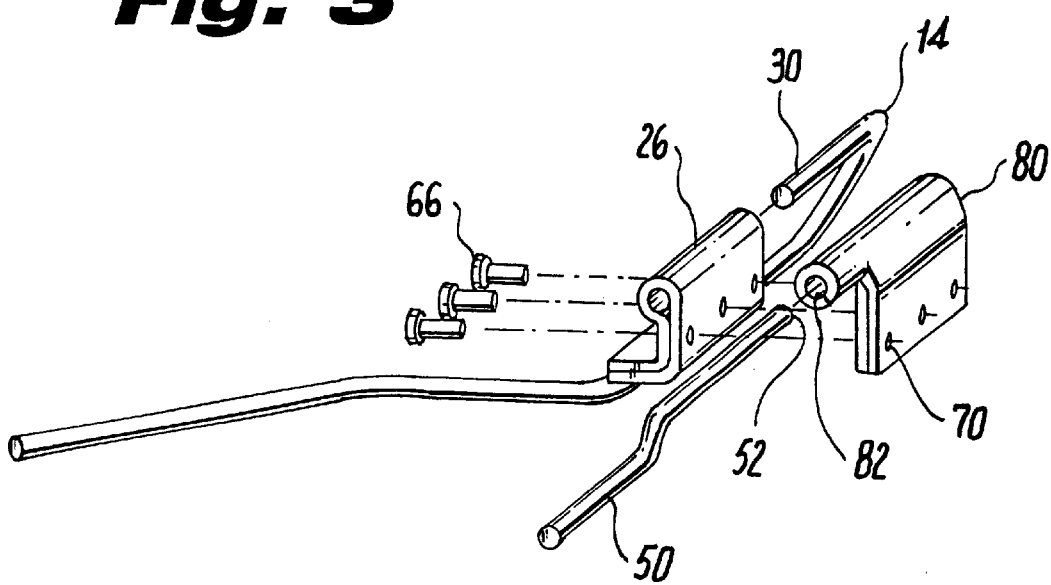
FIG. 3 illustrates, in a view similar to FIG. 2, a further embodiment of a heat pipe hinge having an extension formed thereon for protecting the heat pipe from bending stresses.

Basically, heat is transported through the heat pipe 14 and transferred to a heat conduction member 26 pursuant to the invention, as described in more detail in the illustration of FIGS. 2 and 3 of the drawings. As illustrated, the heat conduction member 26 is formed of a high thermal conductivity material, such as aluminum or copper, or of a graphite fiber composite. Generally, when formed from the metallic components, the member 26 is bent from sheet material which has been cut to size prior to being shaped into its final configuration, as shown in FIGS. 2 and 3 of the drawings. In a particularly advantageous embodiment, the heat conductive material is constituted of 1100 aluminum, which generally possess a higher thermal conductivity than other usual aluminum alloys, and is easily formed, bent or extruded in order to produce the heat conduction member 26. The latter is formed to provide a tubular portion 28 in a tight surface contact with the heat pipe 14 when the end 30 of the latter is inserted into the opening 32 of the tubular portion 28 of the heat conduction member 26. Furthermore, the member 26 extends into an L-shaped flange 34 which may have suitable fasteners 36 for attachment to the housing portion 18 of the computer 10. Alternatively, the heat conduction member 26 can be wrapped around the heat pipe 14 during forming, so as to thereby allow for a good thermal contact between these two members 14, 26.

As shown in FIG. 2, in this instance sheet material is utilized to form the component or heat conduction element 26; for instance, sheet 1100 aluminum having a thickness of 1.5 mm is bent or shaped around the heat pipe 14 which posses an external diameter of approximately 3 mm; with the length of the contact between the two members 14, 26 being about 50 mm.

The hinge structure 40 which connects the panel or cover portion 42 of the display assembly 44 to the base portion or housing 18 of the computer 10 is constituted of a similar material and in the similar manufacturing manner as is the heat conduction element 26. in this instance, the wrapped around tubular portion 46 of the hinge 40 which forms the opening 48 into which the secondary heat pipe 50 has an end 52 inserted, unlike the heat pipe end 30 is provided in the heat conduction member 26 which is essentially non-rotatable in view of the tight grip exerted on the heat pipe by the opening 32 formed in the tubular portion 28; the hinge structure 40 has the wrapped tubular portion 46 forming the opening 48 extending about the second heat pipe end 52 at a clearance therebetween so as to enable the second heat pipe 50 to rotate relative to the hinge 40. This clearance; however, is maintained as close or narrow as possible in order to maximize the heat through-put or transfer from the primary heat pipe 14 to the secondary heat pipe 50. An acceptable clearance between the second heat pipe 50 and the opening 48 in the hinge 40 is approximately 10–20 micrometers, which causes the diameter of the opening or hole 48 to be approximately 20 to 40 micrometers larger than the diameter of the second heat pipe 50. The second heat pipe is thermally attached to a heat spreader 90 in the display assembly 44.

The portion of the thermal conduction member 26 which is provided with the bend or flange 34 or the bend or flange portion 60 of the hinge 40 are unnecessary for the thermal operation, but primarily serve the purpose for a convenience of mounting in a perpendicular computer and causing the rotational axis of the second heat pipe 50 to extend collinear with the axis of rotation of the mechanical hinges 62, 64.

As illustrated in FIGS. 2 and 3, the heat conduction member 26 is attached to the hinge structure 40 through the intermediary of detachable fasteners 66, such as screws passing through bores in the flange 34 of the thermal conduction member 26 and aligned threaded bores 70 in the flange portion 60 of the hinge 40. The thermal conduction member 26 has the lower bent flange portion also adapted to be provided with suitable screws or fastening means enabling attachment thereof to the rear edge of the base portion or housing 18 of the computer 10 containing the heat-generating components or electronics. Ordinarily, pursuant to the prior art, most types of hinges are constituted of a single block which thermally connect the primary heat pipe to the secondary heat pipe or are constituted of mating block portions which must be machined, thereby rendering assembly of the computer housing portions difficult, although maximizing thermal through-put. However, by being able to separate the two pipes, and using inexpensive formable or bendable hinge and thermal conduction elements, the assembly of the personal computer 10 can be implemented in a highly cost-effective manner.

Although the degradation of thermal performance may be approximately 0.5 watts; for example, on a system employing 3 mm diameter pipes and a through-put of 8–10 watts, such losses are considered to be negligible and acceptable in the transference of heat from the heat generating element to the panel or cover which contains a heat sink and a heat dissipation structure extending over a large surface area.

Figure 4:
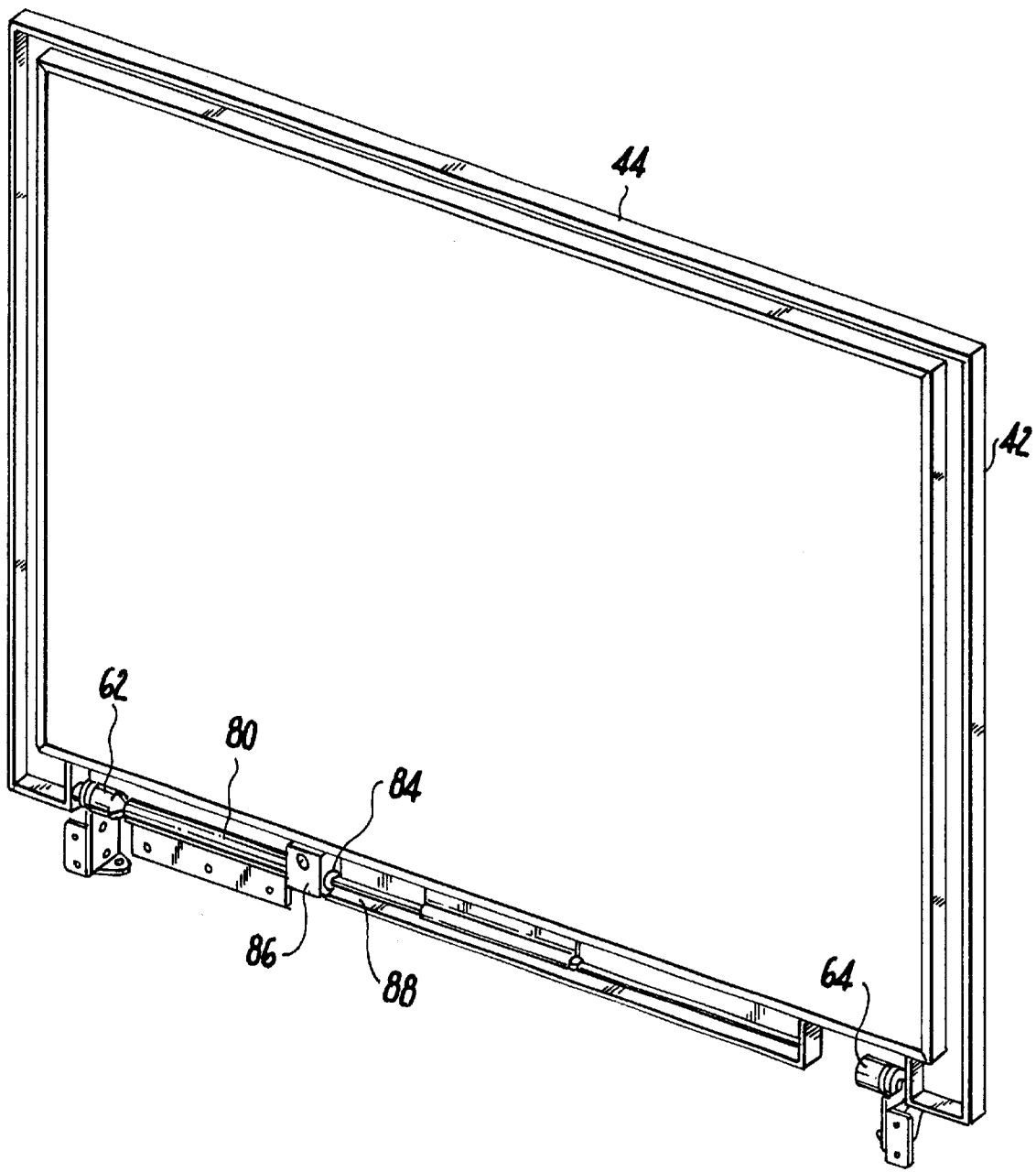
FIG. 4 illustrates a perspective view of the display assembly of a portable personal computer, with the display bezel having been removed for purposes of clarity, and representing an embodiment of the heat pipe hinge which protects the heat pipe from bending stresses which are encountered prior to the assembly of the computer.

With respect to the modified embodiment of FIG. 3 of the drawings, in that instance, the hinge 80 which is adapted to receive the end 52 of the second or secondary heat pipe 50 leading to the heat sink or heat dissipation structure in the computer display assembly 44, inasmuch as the heat pipe 50 is cantilevered from the display assembly, it is still vulnerable to bending notwithstanding the minimum length thereof, in view of bending during the assembly of the computer 10, particularly inasmuch as the heat pipe 50 is ordinarily constituted of soft copper tubing. The embodiment of FIG. 3 of the drawings addresses this problem in that the hinge 80 which is similar to the hinge structure 40 shown in FIG. 2 of the drawings, is provided with an integral tubular extension 82 along the tubular portion 46 adapted to receive the end 52 of the second heat pipe 50. This extension 82 fits loosely into a hole 84 formed in a support block 86, as shown in FIG. 4 of the drawings, which is fixedly arranged in the lower edge portion 88 of the display assembly 44 of the computer 10. The loose fit between the extension 82 and the hole 84 formed in support block 86 enables the hinge 80 to rotate relative to the remainder of the display assembly, whereas at a concurrent subjection of the hinge 80 to undesirable forces during assembly, handling or shipping of the display assembly, any stresses generated by these forces are taken up by the extension 82 on the hinge 80 and the block 86 on the display assembly 44 into which the extension is inserted.

Figure 5:
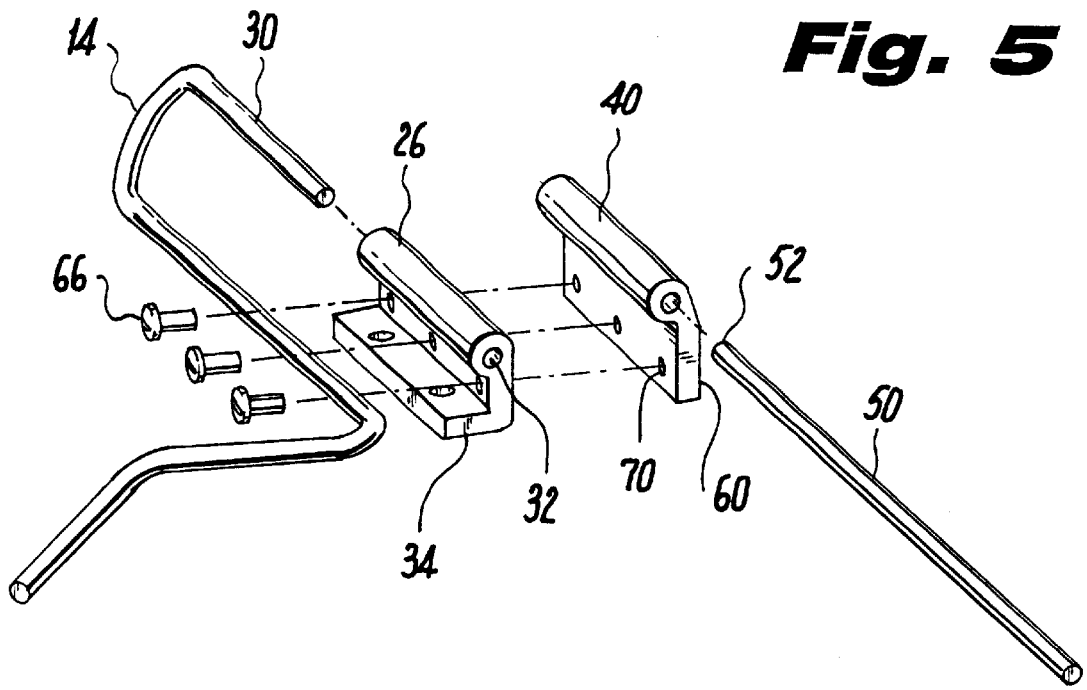
FIG. 5 illustrates a perspective view, on an enlarged scale, of a third embodiment of a heat pipe hinge construction pursuant to the invention.

With regard to FIG. 5 of the drawings, wherein components which are similar to or identical with those illustrated in the preceding embodiments are identified by the same reference numerals; in that instance, the heat conduction member 26 is constituted of an extrusion rather than employing sheet material with bending of the latter as in the preceding embodiments. The materials which are employed, and for the remainder the function and structure, are analogous with that shown in FIG. 2 of the drawings.

Figure 6:
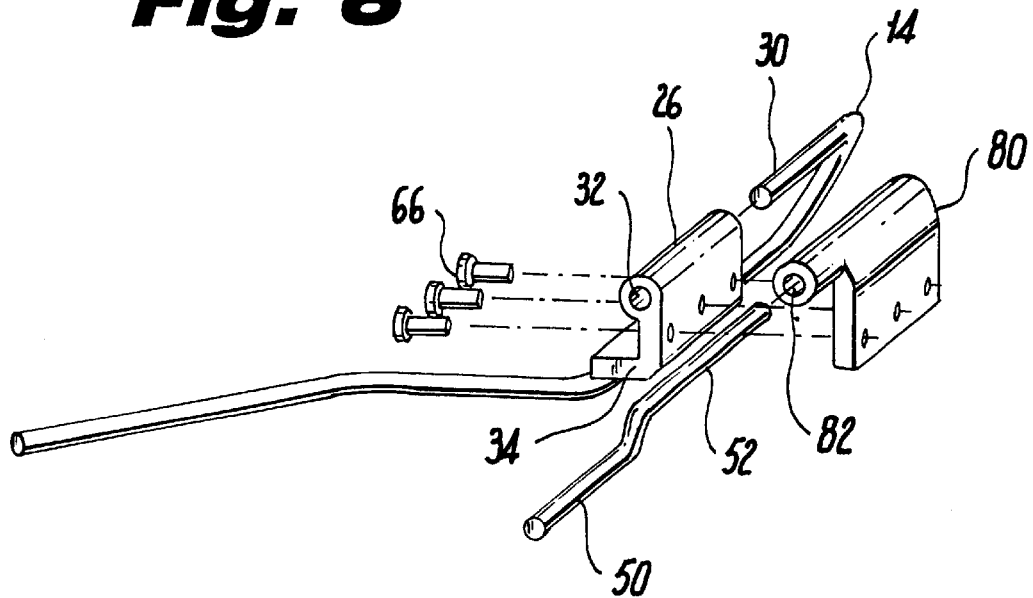
FIG. 6 illustrates a perspective view, similar to Figure of a fourth embodiment of a heat pipe hinge construction.

Similarly, the modified embodiment of FIG. 6 of the drawings which is similar to FIG. 3, with the exception that in this instance rather than using sheet aluminum for the hinge construction, the components and the tubular extension are formed of an extruded structure rather than being bent and shaped. This embodiment requires that the extension which is adapted to receive the end 52 of the second heat pipe 50 which is insertable into the block 86 on the panel must be machined from the extrusion.

From the foregoing, it becomes readily apparent that the heat pipe hinge constructions adapted to enhance the cooling capacity of portable personal computers are of a simple and inexpensive nature, and readily facilitate the separate manufacture of the lower housing portion 18 of the computer 10 and the panel assembly 44 thereof, without undue risk of damage being encountered by the delicate heat pipes 14, 50 employed for the transfer of heat generated by the computer electronics to a heat sink and heat dissipating area formed in the display assembly of the computer 10. The extension 82 can also be conceivably located at the opposite end of hinge 80, and an equivalent of block 86 can be incorporated into the mechanical hinge 62.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described our invention, what we claim as new, and desire to secure by Letters Patent is:

1. An arrangement for dissipating heat generated by at least one electronic component of a computer having a bottom housing for a keyboard and a display assembly hingedly connected to a rear edge of said housing, said at least one electronic component being located in said housing, said heat dissipating arrangement comprising a first heat pipe formed from a length of tubing having a first end connected to said at least one heat-generating electronic component; a heat conduction member mounted at a rear edge of said housing having heat transferred thereto by thermal conduction with an opposite end of said first heat pipe from said at least one electronic component; a hinge member on said display assembly; a second heat pipe formed from a length of tubing having a first end rotatably attached to said hinge member and an opposite end thermally connected to heat dissipating means on said display assembly; and fastener means connecting said hinge member to said heat conduction member for transferring heat therethrough from said first heat pipe to said second heat pipe while facilitating the assembly and disassembly between said heat conduction and hinge members, said heat conduction member consisting of bent sheet metal forming a cylindrical portion for fixedly receiving the opposite and of said first heat pipe secured against relative rotation; said heat conduction member further including an angled flange portion depending from said cylindrical portion which is fastenable to said hinge member; said hinge member consisting of bent sheet metal forming a cylindrical portion having the first end of said second heat pipe rotatably housed therein; said cylindrical portion of the hinge member including an integral extension rotatably housing said first end of the second heat pipe; and apertured block means mounted on said display assembly encompassing said extension so as to protect the heat pipe arranged therein.

2. An arrangement as claimed in claim 1, wherein said first end of the second heat pipe and said hinge member are connected so as to be rotatably movable relative to each other responsive to pivoting movement of said display assembly about said hinge connection.

3. An arrangement as claimed in claim 1, wherein said hinge member includes a flange portion depending from said cylindrical portion, said flange portion being attachable to a surface of the angled flange portion of said heat conduction member through the intermediary of fasteners.

4. An arrangement as claimed in claim 1, wherein said apertured block means comprises a component of the hinge member.

5. An arrangement as claimed in claim 1, wherein said heat conduction member consists of an extrusion having a cylindrical portion for fixedly receiving the opposite and of said first heat pipe secured against relative rotation.

6. An arrangement as claimed in claim 5, wherein said heat conduction member includes an angled flange portion depending from said cylindrical portion which is fastenable to said hinge member.

7. An arrangement as claimed in claim 6, wherein said hinge member consists of an extrusion having a cylindrical portion with the first end of said second heat pipe being rotatably journaled therein.

8. An arrangement as claimed in claim 7, wherein said hinge member includes a flange portion depending from said cylindrical portion, said flange portion being attachable to a surface of the angled flange portion of said heat conduction member through the intermediary of fasteners.

9. An arrangement as claimed in claim 7, wherein said cylindrical portion of the hinge member includes an integral extension rotatably housing said first end of the second heat pipe; and apertured block means mounted on said display assembly encompassing said extension so as to protect the heat pipe arranged therein.

10. An arrangement as claimed in claim 5 or 7, wherein said extrusion is selected from the group of materials consisting of aluminum, copper and a graphite fiber composite.

11. An arrangement as claimed in claim 1, wherein said heat dissipating means comprises a plate element mounted in said display assembly for dissipating heat to the surroundings.

12. An arrangement as claimed in claim 11, wherein said plate element comprises a sheet fastened to an interior surface of said display assembly.

13. An arrangement as claimed in claim 1, wherein said computer is a laptop computer.

14. A method for dissipating heat generated by at least one electronic component of a computer having a bottom housing for a keyboard and a display assembly hingedly connected to a rear edge of said housing, said at least one electronic component being located in said housing, said heat dissipating method comprising arranging a first heat pipe consisting of a length of tubing having a first end connected to said at least one heat-generating electronic component; mounting a heat conduction member at a rear edge of said housing for having heat transferred thereto by thermal conduction with an opposite end of said first heat pipe from said at least one electronic component; a hinge member on said display assembly; arranging a second heat pipe consisting of a length of tubing to have a first end rotatably attached to said hinge member and an opposite end thermally connected to heat dissipating means on said display assembly; and having fastener means connecting said hinge member to said heat conduction member for transferring heat therethrough from said first heat pipe to said second heat pipe so as to facilitate the assembly and disassembly between said heat conduction and hinge members; said heat conduction member consisting of bent sheet metal forming a cylindrical portion for fixedly receiving the opposite and of said first heat pipe secured against relative rotation, said heat conduction member further including an angled flange portion depending from said cylindrical portion which is fastenable to said hinge member; said hinge member consists of bent sheet metal forming a cylindrical portion having the first end of said second hinge pipe rotatably journaled therein; said cylindrical portion of the hinge member including an integral extension rotatably housing said first end of the second heat pipe; and apertured block means mounted on said display assembly encompassing said extension so as to protect the heat pipe arranged therein.

15. A method as claimed in claim 14, wherein said first end of the second heat pipe and said hinge member are connected so as to be rotatably movable relative to each other responsive to pivoting movement of said display assembly about said hinge connection.

16. A method as claimed in claim 14, wherein said hinge member includes a flange portion depending from said cylindrical portion, said flange portion being attachable to a surface of the angled flange portion of said heat conduction member through the intermediary of fasteners, said cylindrical portion of the hinge member includes an integral extension rotatably housing said first end of the second heat pipe; and apertured block means mounted on said display assembly encompassing said extension so as to protect the heat pipe arranged therein.

17. A method as claimed in claim 14, wherein said apertured block means comprises a component of the hinge member.

18. A method as claimed in claim 14, wherein said heat conduction member consists of an extrusion including a cylindrical portion for fixedly receiving the opposite and of said first heat pipe secured against relative rotation.

19. A method as claimed in claim 18, wherein said heat conduction member includes an angled flange portion depending from said cylindrical portion which is fastenable to said hinge member.

20. A method as claimed in claim 19, wherein said hinge member consists of an extrusion having a cylindrical portion with the first end of said second heat pipe being rotatably journaled therein.

21. A method as claimed in claim 20, wherein said hinge member includes a flange portion depending from said cylindrical portion, said flange portion being attachable to a surface of the angled flange portion of said heat conduction member through the intermediary of fasteners.

22. A method as claimed in claim 20, wherein said cylindrical portion of the hinge member includes an integral extension rotatably housing said first end of the second heat pipe; and apertured block means mounted on said display assembly encompassing said extension so as to protect the heat pipe arranged therein.

23. A method as claimed in claim 18 or 20, wherein said extrusion is selected from the group of materials consisting of aluminum, copper and graphite fiber composite.

24. A method as claimed in claim 14, wherein said heat dissipating means comprises a plate element mounted in said display assembly for dissipating heat to the surroundings.

25. A method as claimed in claim 24, wherein said plate element comprises a sheet fastened to an interior surface of said display assembly.

26. A method as claimed in claim 14, wherein said computer is a laptop computer.

* * * * *